United States Patent
Ishio et al.

(10) Patent No.: US 6,553,774 B1
(45) Date of Patent: Apr. 29, 2003

(54) SELF-DIAGNOSING APPARATUS FOR REFRIGERATOR

(75) Inventors: Haruyuki Ishio, Kusatsu; Osamu Yamamoto, Kurita-gun, both of (JP)

(73) Assignee: Matsushita Refrigeration Company, Higashi-osaka (JP)

( * ) Notice: Subject to any disclaimer, the term of this patent is extended or adjusted under 35 U.S.C. 154(b) by 0 days.

(21) Appl. No.: 09/508,115

(22) PCT Filed: Sep. 16, 1998

(86) PCT No.: PCT/JP98/04160

§ 371 (c)(1),
(2), (4) Date: Mar. 20, 2000

(87) PCT Pub. No.: WO99/14540

PCT Pub. Date: Mar. 25, 1999

(30) Foreign Application Priority Data

Sep. 18, 1997 (JP) .............................................. 9/253446

(51) Int. Cl.$^7$ ................................................. F25B 49/02
(52) U.S. Cl. .............................. 62/126; 62/127; 62/129; 340/585
(58) Field of Search ........................... 62/126, 127, 125, 62/129, 130; 340/585

(56) References Cited

U.S. PATENT DOCUMENTS

| | | | |
|---|---|---|---|
| 4,490,986 A | * | 1/1985 | Paddock ....................... 62/127 |
| 4,741,170 A | * | 5/1988 | Tershak ....................... 62/127 |
| 4,970,870 A | * | 11/1990 | Midlang et al. ............... 62/126 |
| 5,398,251 A | * | 3/1995 | Shim ........................... 62/126 |
| 5,454,230 A | * | 10/1995 | Janke et al. .................. 62/127 |
| 5,460,006 A | * | 10/1995 | Torimitsu .................... 62/127 |
| 5,535,597 A | * | 7/1996 | An ............................. 62/126 |

* cited by examiner

Primary Examiner—William E. Tapolcai
(74) Attorney, Agent, or Firm—Oblon, Spivak, McClelland, Maier & Neustadt, P.C.

(57) ABSTRACT

To provide a self-diagnosing apparatus for a refrigerator which self-diagnoses an operation condition and advises a user of an appropriate improvement action if there is an abnormal. First, a detector such as an internal temperature sensor detects a plurality of condition-indicative quantities with respect to the refrigerator, and the condition-indicative quantities are stored in a memory part for a predetermined period. A diagnostic device such as a diagnosis calculation value judging part compares the condition-indicative quantities or a diagnosis calculation value which is calculated based on the condition-indicative quantities with a predetermined threshold value, and judges whether the operation condition of the refrigerator is normal or abnormal based on a result of the comparison. At this stage, if the condition-indicative quantities covering the predetermined past period which are stored in the memory are used as the condition-indicative quantities for the diagnosis, it is possible to accurately diagnose without influence of a condition-indicative quantity which suddenly appears. When it is judged that there is an abnormal condition as a result of the diagnosis, an improvement action which is preliminary determined for the abnormal condition is selected. The selected action is displayed visually or as a sound by an outputting device such as a sound emitter. Where a re-diagnosis is executed after a predetermined time since the abovementioned diagnosis and the outputting device output the improvement action based on a result of the re-diagnosis, it is possible to diagnose with an enhanced reliability.

6 Claims, 7 Drawing Sheets

SELF-DIAGNOSING APPARATUS FOR REFRIGERATOR

BACKGROUND OF THE INVENTION

1. Field of the Invention

The present invention relates to a self-diagnosing apparatus for a refrigerator which self-diagnoses the operation condition of a refrigerator such as a refrigerator with a freezer and provides a user with appropriate advice regarding a method for using the refrigerator, etc.

2. Description of the Prior Art

A conventional refrigerator with a freezer for consumers, for example, when an abnormal situation occurs while the refrigerator is in use, emits an alarm which signals the abnormality, so that a service person who visits a user in response to a request of repair from the user replaces a part or otherwise appropriately repairs the refrigerator.

Among such conventional refrigerators, one which is proposed in Japanese Laid-Open Patent Publication No. 6-265259 of 1994, for instance, by means of sensors which are disposed inside and outside the apparatus at various sections, detects temperatures at the respective sections, and displays an alarm message when a detected temperature exceeds a predetermined value, while cumulatively storing the number of times at which such alarm messages are displayed, the frequency of opening and closing a door, and the like. Hence, using the cumulatively stored information, a service person who is in charge of repair work can provide detailed services in accordance with an actual condition in which the apparatus is used.

Furthermore, refrigerators with freezers for consumers, for example, are in various different conditions among individual homes, with respect to the conditions of installation, condition of use, room temperature, location of installation, the frequency of door opening and closing density of articles placed in the refrigerator, etc. Therefore, a cause of abnormality such as a failure of the temperature within a refrigerator to decrease is, in many cases, attributable to a condition of installation, a condition of use, etc. Further, when used under an inappropriate condition of installation, use, etc., over a long period of time, the machine itself may break down.

A conventional refrigerator as described above, although capable of emitting an alarm in response to abnormality, simply displays a condition of the abnormality at that time (e.g., an abnormal temperature within the apparatus), and therefore, a user can not tell the cause, i.e., whether the cause is a breakdown of the machine itself or attributed to a condition of use or the like, until a service person arrives. This, accordingly, can not prevent a breakdown due to a continuous inappropriate condition of installation, use, etc.

The present invention has been made considering the situation above, and accordingly, aims at providing a self-diagnosing apparatus for a refrigerator which self-diagnoses a condition in which the refrigerator operates and provides a user with an appropriate action to be taken in case there is an abnormality with the refrigerator apparatus.

SUMMARY OF THE INVENTION

To attain the object described above, the present invention is directed to a self-diagnosing apparatus for a refrigerator which self-diagnoses an operation condition of the refrigerator, comprising: detecting means which detect a plurality of condition-indicative quantities with respect to the refrigerator; diagnosis means which compare the condition-indicative quantities or diagnosis calculation values which are calculated based on the condition-indicative quantities with a predetermined threshold value, judges whether an operation of the refrigerator is normal or abnormal, and selects a predetermined improvement action which is set in advance for a diagnosed abnormal condition; and an outputting means which outputs the improvement action selected by said diagnosis means, wherein when the diagnosis result indicates abnormality, said outputting means outputs the improvement action based on a second diagnosis means provided after a predetermined time.

Further, memory means for storing the condition-indicative quantities which are detected by the detecting means for a predetermined period and the diagnosis means may diagnose based on the condition-indicative quantities covering the predetermined period which are stored in the memory means, which makes it possible to accurately diagnose without influence of a condition-indicative quantity which suddenly appears.

Still further, the outputting means may provide a visual and/or auditory display, which enables to easily inform a user of a diagnosis result.

In the self-diagnosing apparatus for a refrigerator according to the present invention, first, the detecting means detects a plurality of condition-indicative quantities with respect to the refrigerator. The detected condition-indicative quantities are stored in the memory means, for instance, for a predetermined period. The diagnosis means thereafter compares the condition-indicative quantities or the diagnosis calculation values which are calculated based on the condition-indicative quantities with a predetermined threshold value, and judges whether an operation of the refrigerator is normal or abnormal based on a result of the comparison. At this stage, if the condition-indicative quantities covering the predetermined period which are stored in the memory means are used as the condition-indicative quantities which are used for the diagnosis, it is possible to accurately diagnose without influence of a condition-indicative quantity which suddenly appears.

When it is judged that there is abnormality as a result of the diagnosis, a re-diagnosis may be provided after a predetermined time from the time the diagnosis above is obtained. When it is judged that there is abnormality as a result of the re-diagnosis, a predetermined improvement action which is set in advance for that condition is selected, and displayed visually or as a sound by the outputting means. Thus, since a final judgment is made based on two diagnosis results, one from the first diagnosis and the other from a re-diagnosis which is executed after a predetermined time, it is possible to diagnose with excellent reliability.

A more complete appreciation of the present invention and many of the attendant advantages thereof will be readily obtained as the same becomes better understood by reference to the following detailed description when considered in connection with the accompanying drawings, wherein:

DETAILED DESCRIPTION OF THE PREFERRED EMBODIMENTS

In the following, for understanding of the present invention, a preferred embodiments and aspects of the present invention will be described with reference to the associated drawings. As herein described, the following preferred embodiments and aspects are merely one example which embodies the present invention, and therefore, does not limit the technical scope of the present invention in any manner.

Figure 1:
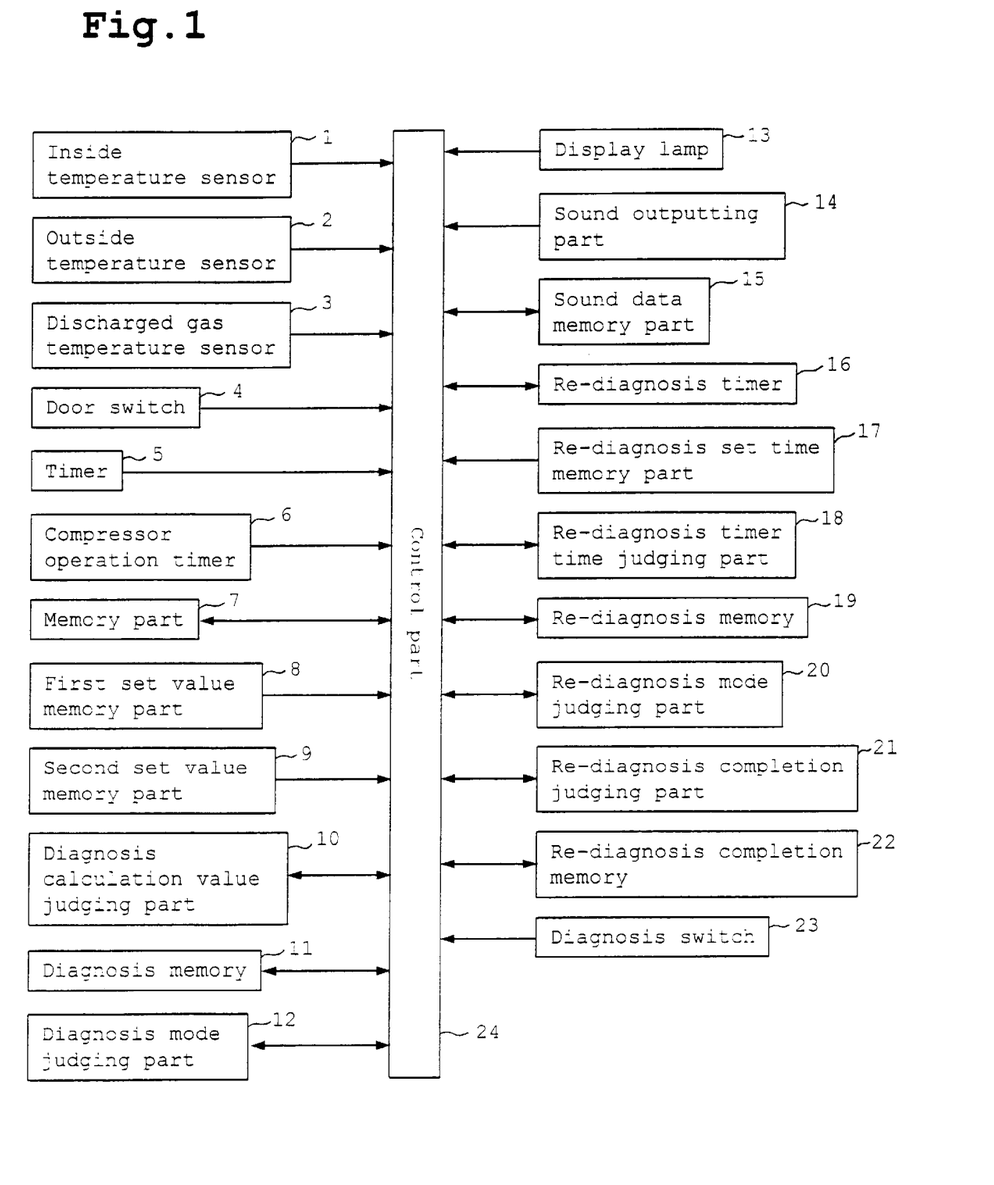
FIG. 1 is a block diagram showing a schematic structure of a self-diagnosing apparatus A1 of a refrigerator according to a preferred embodiment of the present invention.

A self-diagnosing apparatus A1 of a refrigerator according to the preferred embodiment is a self-diagnosing apparatus which is applicable to a refrigerator with a freezer for consumers. As shown in FIG. 1, the device A1 is constructed with an inside temperature sensor 1, an outside temperature sensor 2, a discharged gas temperature sensor 3, a door switch 4, a timer 5, a compressor operation timer 6 (all of which up to this point are examples of detecting means), a memory part 7 (which corresponds to memory means), a first set value memory part 8, a second set value memory part 9, a diagnosis calculation value judging part 10, a diagnosis memory 11, a diagnosis mode judging part 12 (all of which up to this point are examples of diagnosis means), a display lamp 13, a sound outputting part 14, a sound data memory part 15 (all of which up to this point are examples of outputting means), a re-diagnosis timer 16, a re-diagnosis set time memory part 17, a re-diagnosis timer time judging part 18, a re-diagnosis memory 19, a re-diagnosis mode judging part 20, a re-diagnosis completion judging part 21, a re-diagnosis completion memory 22, and a diagnosis switch 23 all connected to a control part 24.

The inside temperature sensor 1, the outside temperature sensor 2 and the discharged gas temperature sensor 3 detect an inside temperature, an outside temperature and a temperature of discharged gas which is discharged from a compressor, respectively. The door switch 4 is turned on and off as a door is opened and closed. The timer 5 measures an operation time of the refrigerator, while the compressor operation timer 6 measures an operation time of the compressor.

The memory part 7 stores respective detected condition-indicative quantities which are detected by the detecting means, and holds the condition-indicative quantities for a predetermined period.

The diagnosis calculation value judging part 10 performs predetermined processing on the respective condition-indicative quantities which are stored in the memory part 7, to thereby calculate a diagnosis calculation numerical value, and compares the diagnosis calculation value with a first set value which is stored in advance in the first set value memory part 8 and/or a second set value which is stored in advance in the second set value memory part 9. A result of the comparison (i.e., a result of the diagnosis) is stored in the diagnosis memory 11.

The diagnosis mode judging part 12 judges whether the apparatus is in a normal or abnormal condition from the result of the diagnosis which is stored in the diagnosis memory 11, and the display lamp 13 and the sound outputting part 14 display a result of the judgment. At this stage, the display lamp 13, by means of a lamp, visually displays the normal or abnormal condition, while the sound outputting part 14 phonetically displays the normal or abnormal condition by using sound data which are stored in sound data memory part 15 in advance.

The re-diagnosis timer time judging part 18, in order to perform re-diagnosis after a predetermined time from the first diagnosis, judges whether a measured time which is measured by the re-diagnosis timer 16 has reached a time which is preliminary stored in the re-diagnosis set time memory part 17. In accordance with a "re-diagnosis flag" which is set in the re-diagnosis memory 19, the re-diagnosis mode judging part 20 judges whether the current diagnosis is the first diagnosis or a re-diagnosis, and forces the steps related to the first diagnosis to be bypassed if the current diagnosis is a re-diagnosis. The re-diagnosis completion judging part 21 judges whether a re-diagnosis has been already performed, in accordance with a "re-diagnosis completion flag" which is set in the re-diagnosis completion memory 22.

Further, the re-diagnosis switch 23 is a switch to be pressed by a user for the purpose of starting a diagnosis of a refrigerator with a freezer. The control part 24 controls operations of the respective parts described above.

Now, a specific example of self-diagnosis processing by the self-diagnosing apparatus A1 which has such a structure as described above will be described with reference to the flow charts in FIGS. 2 through 7.

Figure 2:
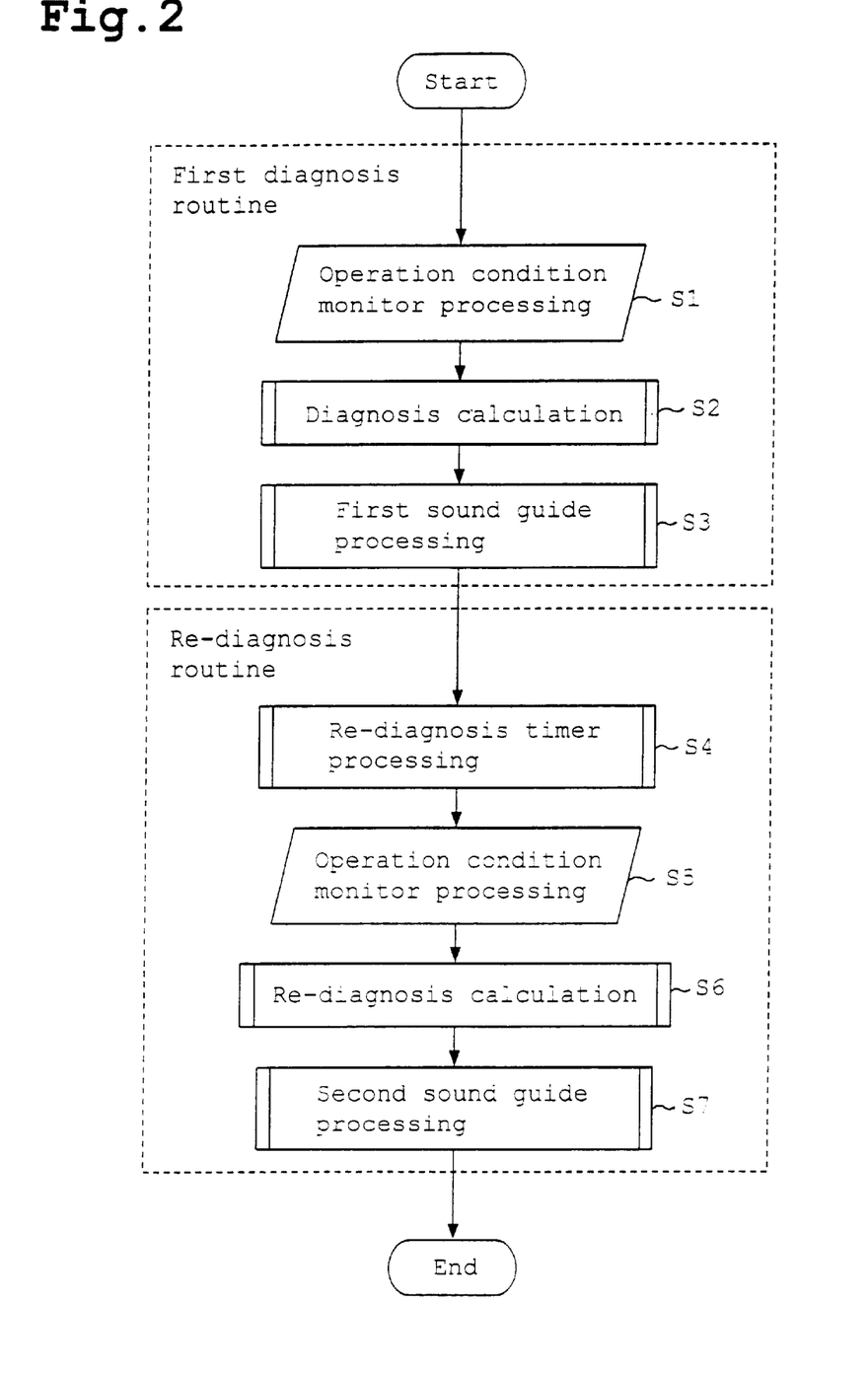
FIG. 2 is a flow chart schematically showing an overall sequence of self-diagnosis processing performed by the self-diagnosing apparatus A1.

FIG. 2 shows a schematic overall flow of self-diagnosis processing. As shown in FIG. 2, the self-diagnosis processing is generally divided into a first diagnosis routine and a re-diagnosis routine. The first diagnosis routine is a diagnosis operation which is executed immediately after a user turns on the diagnosis switch, whereas the re-diagnosis routine is a diagnosis operation which is executed after a predetermined time from completion of the first diagnosis routine. Thus, in the self-diagnosis processing, "abnormality" is not judged with only one diagnosis, but is judged with the re-diagnosis which is executed after a predetermined time.

In the following, the contents of the processing will be described, in relation to each step.

Figure 3:
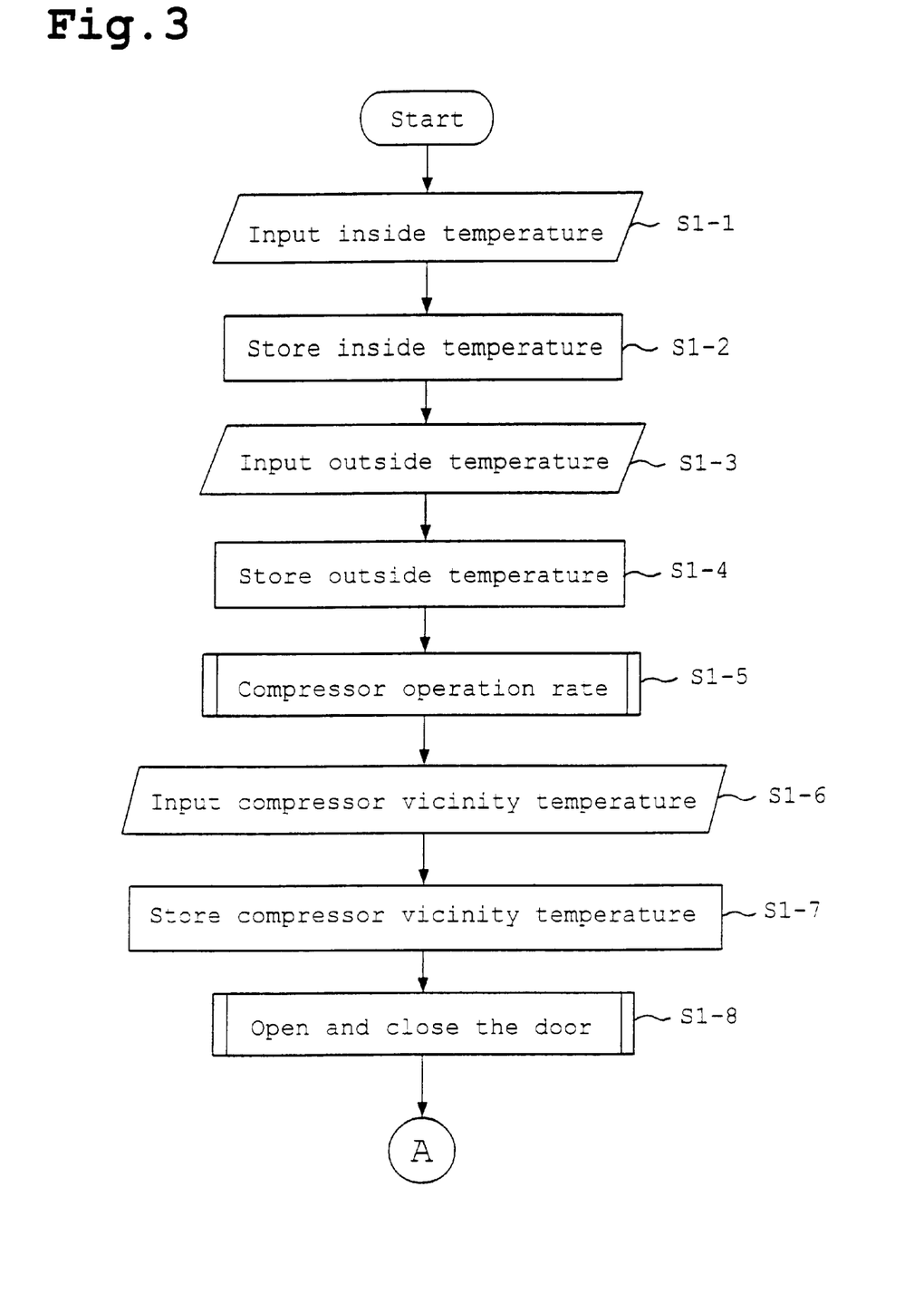
FIG. 3 is a flow chart schematically showing a sequence of monitoring of an operation condition.

[Step S1: Operation condition monitor processing]

This step is a step for acquiring data which are necessary for a diagnosis. FIG. 3 shows a detailed flow.

First, the inside temperature sensor 1 detects an inside temperature within the refrigerator (Step S1-1), and the detected inside temperature is stored in the memory part 7 under the control of the control part 24 (Step S1-2). Moreover, the outside temperature sensor 2 detects an outside temperature outside the refrigerator (Step S1-3), and the detected outside temperature as well is stored in the memory part 7 (Step S1-4).

Further, the control part 24 calculates a compressor operation rate based on operation histories of the timer 5 and the compressor operation timer 6 which are stored in the memory part 7, and the compressor operation rate is stored in the memory part 7 (Step S1-5).

A compressor vicinity temperature is detected by the discharged gas temperature sensor 3 which is disposed at a discharge pipe of the compressor (Step S1-6), and stored in the memory part 7 under the control of the control part 24 (Step S1-7).

With respect to the frequency of door opening and closing, a door open/close time cumulative value and a door-open time cumulative value are calculated based on operation histories of the timer 5 and the door switch 4 which are stored in the memory part 7 (Step S1-8).

The operation condition monitor processing is not limited to a situation where the diagnosis switch 23 is pressed, but rather may be executed for every predetermined time if necessary. The respective detected values (i.e., the condition-indicative quantities) which are stored in the memory part 7 are each cumulatively held during a predetermined period, and used for diagnosis calculation processing which will be described below while referred to by a service person during maintenance work.

Figure 4:
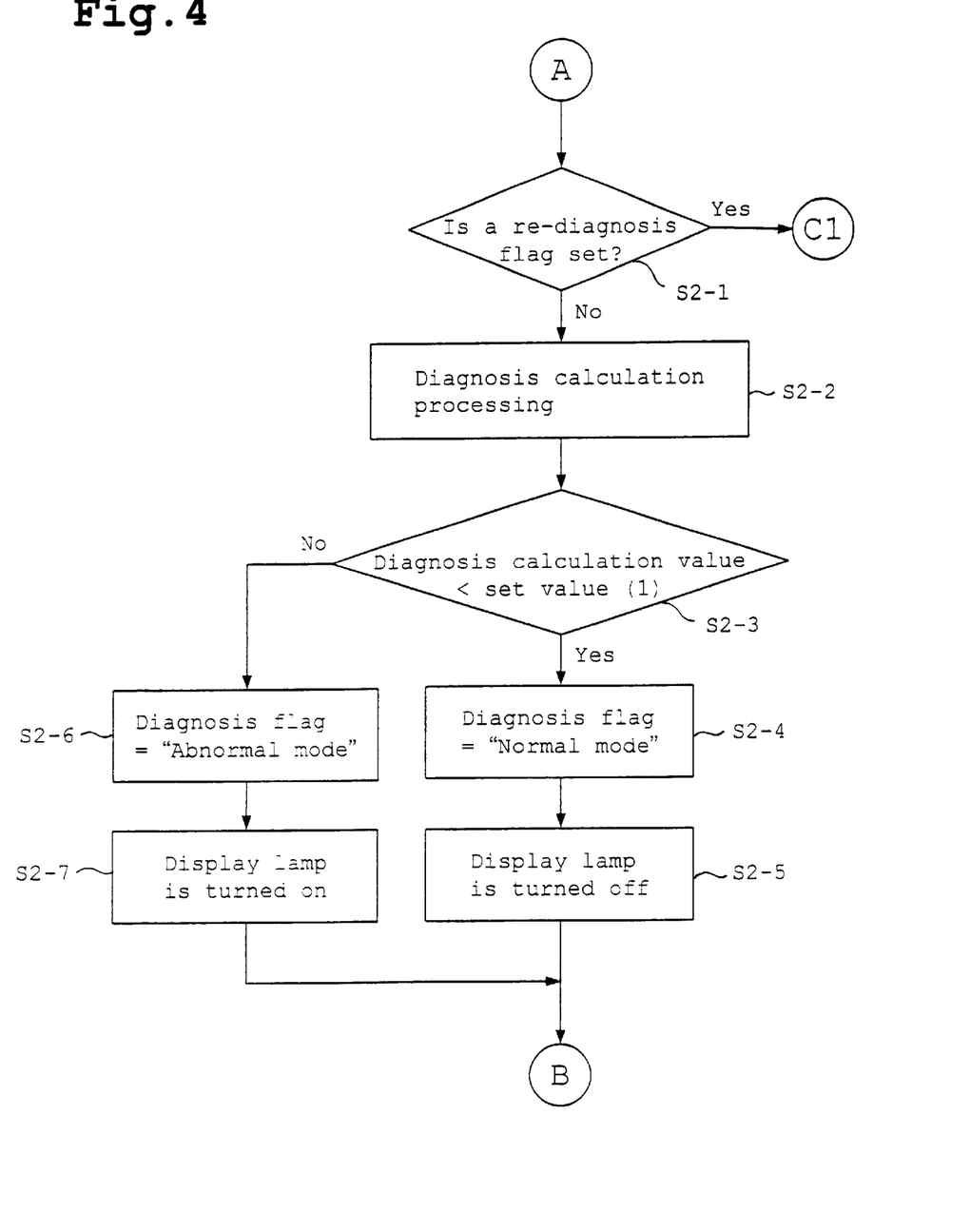
FIG. 4 is a flow chart schematically showing a sequence of diagnosis calculation processing for a first diagnosis.

[Step S2: Diagnosis calculation processing]

This step is a step of a first diagnosis and for turning on the display lamp 13 if a diagnosis result indicates abnormality. FIG. 4 shows a detailed flow.

First, the re-diagnosis mode judging part 20 judges whether the "re-diagnosis flag" is set in the re-diagnosis memory 19 (Step S2-1). The "re-diagnosis flag" is set upon completion of the first diagnosis (Step S4-1 which will be described later). If the "re-diagnosis flag" is set, the steps related to the first diagnosis are bypassed and steps related to a re-diagnosis (Step S4-4) and subsequent processing are executed.

If the "re-diagnosis flag" is not set, subsequent diagnosis calculation processing (Step S2-2) and diagnosis calculation value judging processing (Step S2-3) are executed. At these steps, the diagnosis calculation value judging part 10 performs predetermined processing on the respective condition-indicative quantities which are stored in the memory part 7, thereby calculating a diagnosis calculation numerical value. As the condition-indicative quantities at this stage, data of a predetermined past period (history data or cumulative data) are used depending on necessity. The diagnosis calculation value is then compared with the first set value which is stored in the first set value memory part 8 in advance. An example of the diagnosis calculation value may be a combination of the inside temperature, the outside temperature and the door open/close frequency. If the diagnosis calculation value is larger than the predetermined first set value, it is judged that there is an abnormality. Alternatively, if a diagnosis calculation value which is obtained from a difference between detected values of a plurality of inside temperature sensors 1 is larger than the predetermined first set value, it is judged that there is an abnormality.

At Step S2-3, if it is judged that the diagnosis calculation value is smaller than the predetermined first set value, the "diagnosis flag" of a normal mode is set in the diagnosis memory 11 (Step S2-4), and the display lamp 13 for informing abnormality is kept turned off (Step S2-5).

At Step S2-3, if it is judged that the diagnosis calculation value is equal to or larger than the predetermined first set value, the "diagnosis flag" of an abnormal mode is set in the diagnosis memory 11 (Step S2-6), and the display lamp 13 for informing abnormality is turned on (Step S2-7).

Figure 5:
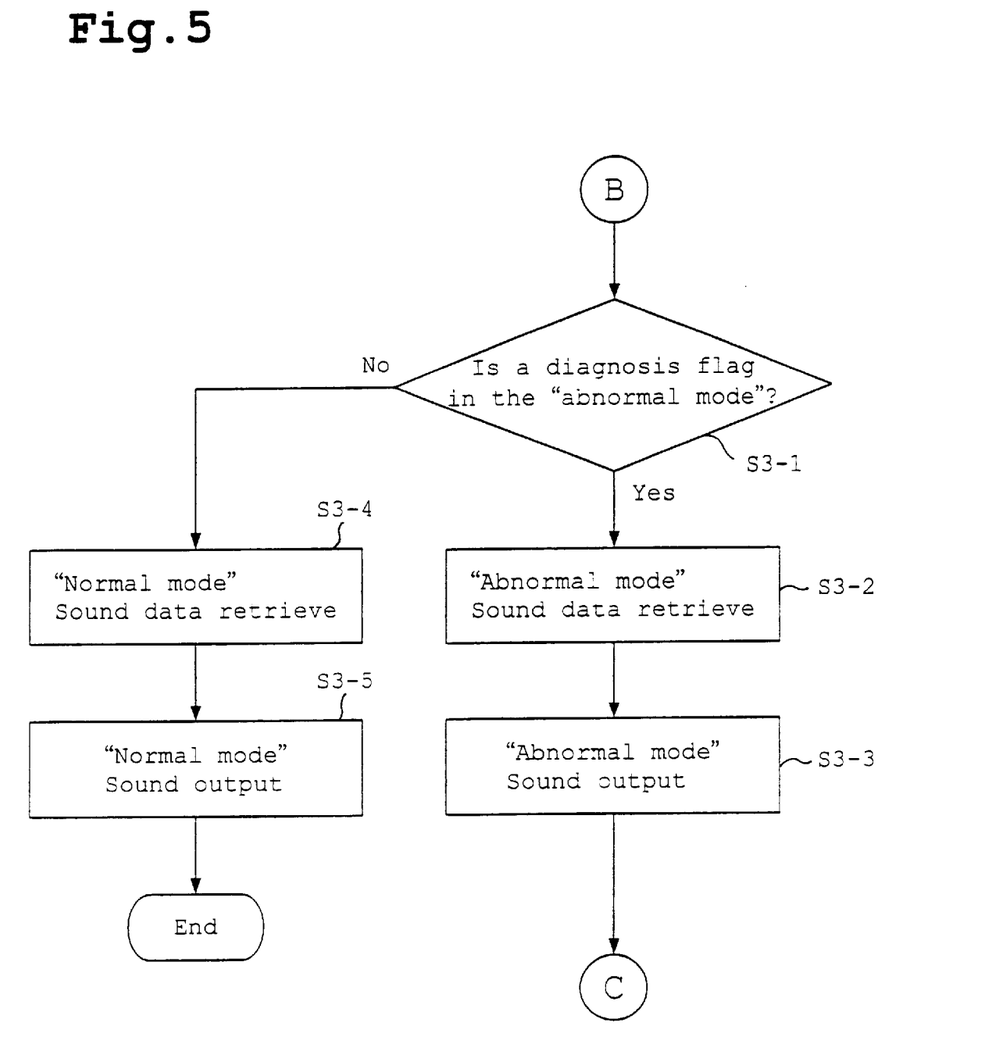
FIG. 5 is a flow chart schematically showing a sequence of first sound guide processing.

[Step S3: First sound guide processing]

This step is for informing a user of a result of the first diagnosis by means of a sound. FIG. 5 shows a detailed flow.

First, the diagnosis mode judging part 12 judges whether the "diagnosis flag" which is set in the diagnosis memory 11 is in the abnormal mode (Step S3-1).

If the "diagnosis flag" is judged to be in the normal mode, the sound outputting part 14 retrieves a sound which is indicative of the normal mode and preliminary stored in the sound data memory part 15, such as a sound reading, "The refrigerator is normally cooled." After the sound is outputted from a speaker, the series of processing is completed.

If the "diagnosis flag" is judged to be in the abnormal mode, the sound outputting part 14 retrieves a sound which is indicative of the abnormal mode and preliminary stored in the sound data memory part 15, such as a sound reading, "We have to re-diagnose. Please press the re-diagnosis switch in another 24 hours." After the sound is outputted from the speaker, the following steps are executed.

Figure 6:
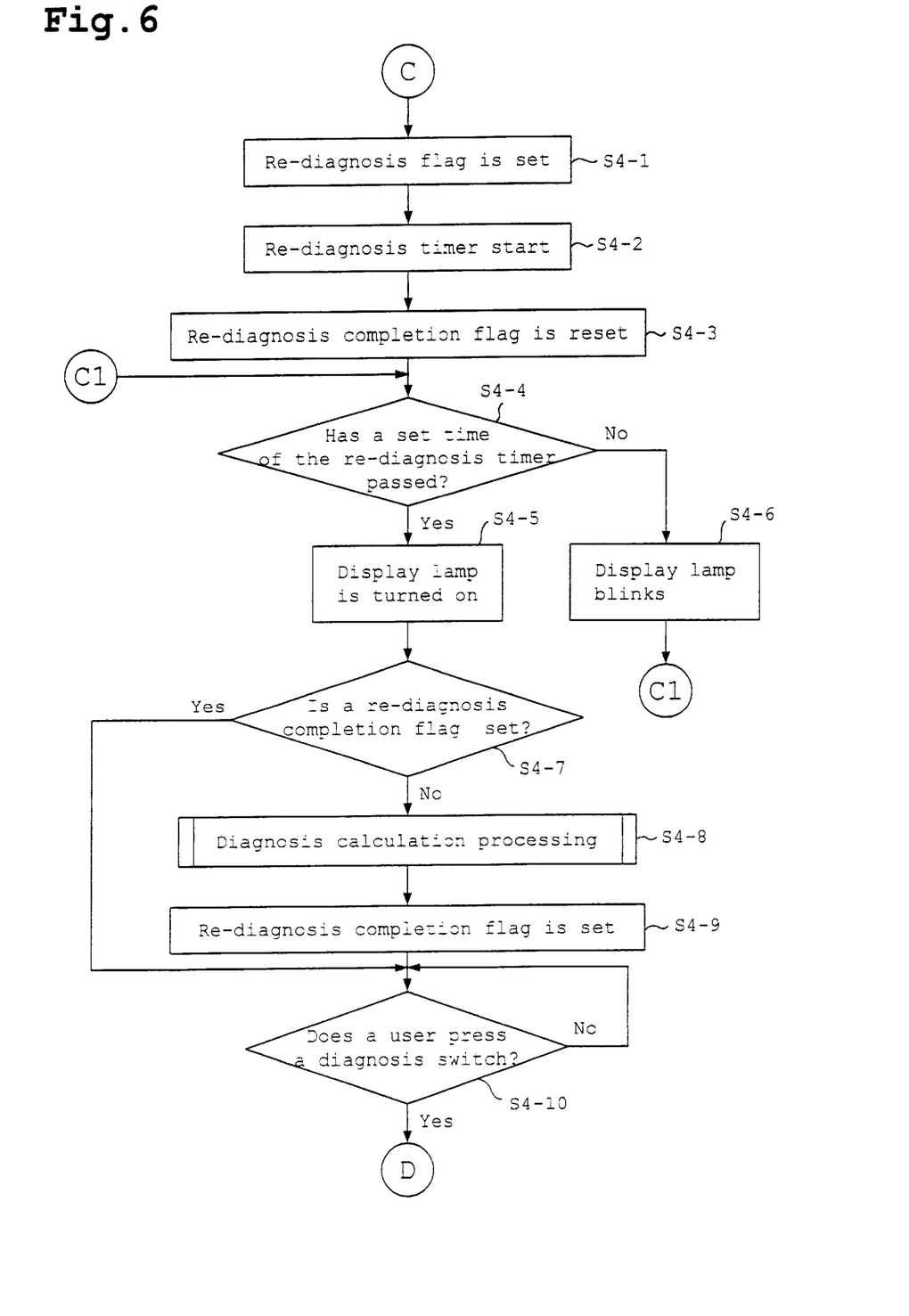
FIG. 6 is a flow chart schematically showing a sequence of re-diagnosis timer processing and a sequence of re-diagnosis calculation processing.

[Step S4 through Step S6: Re-diagnosis timer processing, Operation condition monitor processing, and re-diagnosis calculation processing]

A series of steps are taken for performing timer processing up to a re-diagnosis after a predetermined time (24 hours in this example) since the completion of the first diagnosis and for re-diagnosing. FIG. 6 shows a detailed flow.

First, the "re-diagnosis flag" is set in the re-diagnosis memory 19 (Step S4-1), the re-diagnosis timer 16 starts measuring time (Step S4-2), and the re-diagnosis completion memory 22 resets a "re-diagnosis completion flag" (Step S4-3).

Following this, the re-diagnosis timer time judging part 18 judges whether a time which is measured by the re-diagnosis timer 16 has passed 24 hours set in the re-diagnosis set time memory part 17 (Step S4-4). While the time which is measured by the re-diagnosis timer 16 does not reach 24 hours, the display lamp 13 which was turned on at Step S2-7 is kept blinking (Step S4-6). When the re-diagnosis timer time judging part 18 judges that the time which is measured by the re-diagnosis timer 16 has passed 24 hours, the display lamp 13 which has kept blinking (Step S4-6) is switched to a continuous ON-state (Step S4-5).

The re-diagnosis completion judging part 21 thereafter judges whether the "re-diagnosis completion flag" is set in the re-diagnosis completion memory 22 (Step S4-7). The "re-diagnosis completion flag" is for forcing a re-diagnosis to be performed only one time. Since the "re-diagnosis completion flag" was reset at Step S4-3 in this example, the following Steps S4-8 and S4-9 are executed.

Diagnosis calculation processing at Step S4-8 is exactly the same as that of Step S2-2 (i.e., the diagnosis calculation processing related to the first diagnosis) described earlier. Prior to this step, operation condition monitor processing (Step S5) is performed if necessary, which processing being exactly the same as Step S1 (i.e., the operation condition monitor processing related to the first diagnosis) described earlier.

At the subsequent Step S4-9, the "re-diagnosis completion flag" is set in the re-diagnosis completion memory 22.

After the re-diagnosis at Step S4-8 described above, the device stands by until the user presses the diagnosis switch 23 (Step S4-10).

Figure 7:
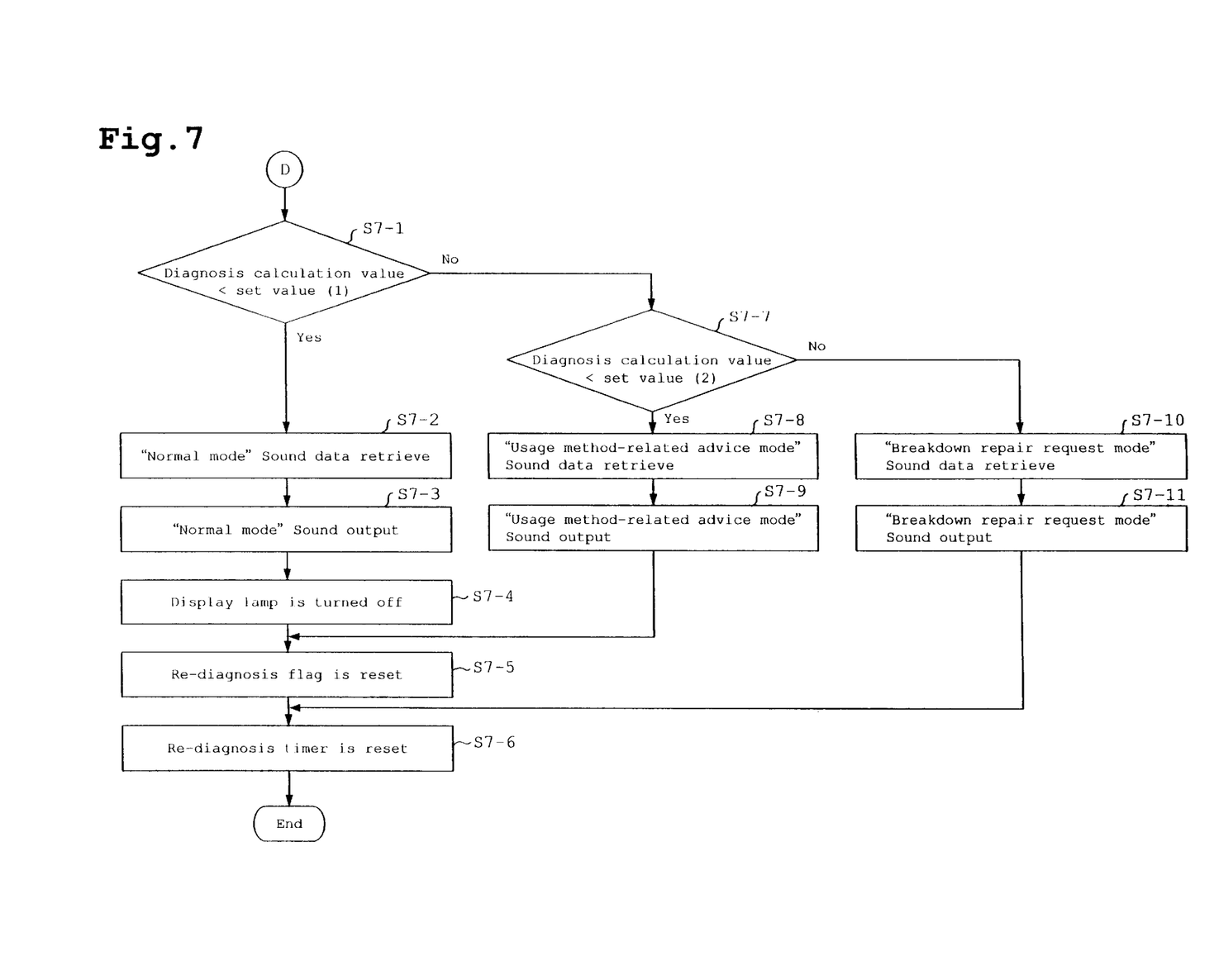
FIG. 7 is a flow chart schematically showing a sequence of second sound guide processing.

[Step S7: Second sound guide processing]

This step is for judging whether a diagnosis result is normal or abnormal using the diagnosis calculation value which is obtained through the diagnosis calculation processing related to a re-diagnosis (Step S4-8), and providing the user with advice in the form of a sound regarding a method of usage for improvement action against the abnormal condition if it is judged that there is an abnormality. FIG. 7 shows a detailed flow. A threshold value for judging whether the diagnosis calculation value is normal or abnormal is the first set value, while a threshold value for judging a breakdown is the second set value. Needless to mention, the first set value less than (<) the second set value holds.

First, the diagnosis calculation value which was obtained at Step S4-8 described above is compared with the first set value which is set in the first set value memory part 8 in advance (Step S7-1).

If the diagnosis calculation value is judged to be smaller than the first set value, the sound outputting part 14 retrieves a sound which is indicative of the normal mode and preliminary stored in the sound data memory part 15, such as a sound reading, "The refrigerator is normally cooled" (Step S7-2), and outputs the sound from the speaker (Step S7-3), and the display lamp 13 which indicates the abnormality is turned off (Step S7-4). The "re-diagnosis flag" set in the re-diagnosis memory 19 is reset (Step S7-5) and the re-diagnosis timer 16 is reset (Step S7-6), completing the series of processing.

If the diagnosis calculation value is judged to be equal to or larger than the first set value at Step S7-1, the diagnosis calculation value is compared with the second set value which is stored in the second set value memory part 9 in advance (Step S7-7).

If the diagnosis calculation value is judged to be smaller than the second set value, the sound outputting part 14 retrieves sound data of a usage method-related advice mode which corresponds to the diagnosis calculation value from the sound data memory part 15 (Step S7-8), and outputs the sound from the speaker (Step S7-9).

The sound data of the usage method-related advice mode may read a sound reading, such as "Make sure the door is not opened too often" and "Make sure the door is not kept open for a long time" if the diagnosis calculation value is based on the history of the inside temperature, the history of the outside temperature, the door open/close frequency, or the like, or alternatively may for instance read, "Make sure the food is not crammed too densely in the refrigerator" if the diagnosis calculation value is based on a difference between the detected values of a plurality of inside temperature sensors 1. Depending on the diagnosis calculation value, the sound data may be an advice regarding a condition of installation, e.g., a message which reads, "Please keep the area around the refrigerator well ventilated".

After the sound data are outputted, the "re-diagnosis flag" set in the re-diagnosis memory 19 is reset (Step S7-5) and the re-diagnosis timer 16 is reset (Step S7-6), completing the series of processing.

Conversely, when the diagnosis calculation value is judged at Step S7-7 described above to be equal to or larger than the second set value, the sound outputting part 14 retrieves sound data of a breakdown repair request mode from the sound data memory part 15, which reads for example, "Please call our service person" (Step S7-10), and outputs the sound data from the speaker (Step S7-11). The re-diagnosis timer 16 is thereafter reset (Step S7-6), completing the series of processing.

As described above, the self-diagnosing apparatus A1 of a refrigerator according to the preferred embodiment, rather than only judging a normal or abnormal condition through a self-diagnosis, provides a user with advice in the form of a sound output as to an appropriate improvement action in the case when abnormality is not attributable to a breakdown of the machine but simply to an inappropriate condition of installation, usage or the like. Hence, the user himself can take improvement action against the abnormal condition without calling a service person, and additionally, can prevent a breakdown which is caused by continued long-term improper installation or usage.

First, since a final judgment is made based on two diagnosis results, one from the first diagnosis and the other from a re-diagnosis which is executed after a predetermined time, it is possible to diagnose with excellent reliability.

Still further, since a diagnosis is provided based on the condition-indicative quantities of a predetermined past period, it is possible to accurately diagnose without influence of a condition-indicative quantity which suddenly appears.

In addition, since a display is given both visually and as a sound, it is possible to inform a user of a diagnosis result accurately and in an easy-to-follow manner.

Although a diagnosis is started when a user presses the diagnosis switch in the preferred embodiment above, the present invention is not limited to this. Instead, the device may self-diagnose every predetermined period (e.g., every week, every month), for instance. Further, in such a case, usage method-related advice may be outputted as a display of characters (on a liquid crystal display, for example).

In addition, only a result of a re-diagnosis may be displayed without displaying a result of the first diagnosis. In this case, a display which for instance reads, "Please wait for a result of the diagnosis" until the result of the diagnosis becomes available.

Alternatively, the device may provide usage method-related advice which encourages a user to improve the condition after the first diagnosis, and the device then may judge from a re-diagnosis whether the improvement action was effective.

As described in the foregoing, the self-diagnosing apparatus for a refrigerator according to the present invention is a self-diagnosing apparatus for a refrigerator which self-diagnoses an operation condition of the refrigerator, comprising: detecting means which detect a plurality of condition-indicative quantities with respect to the refrigerator; diagnosis means which compare the condition-indicative quantities or diagnosis calculation values which are calculated based on the condition-indicative quantities with a predetermined threshold value, judges whether an operation of the refrigerator is normal or abnormal, and selects a predetermined improvement action which is set in advance for a diagnosed abnormal condition; and an outputting means which outputs the improvement action selected by said diagnosis means, wherein when the diagnosis result indicates abnormality, said outputting means outputs the improvement action based on a second diagnosis of said diagnosis means provided after a predetermined time. Hence, it is possible to self-diagnose the operation condition, and advise a user an appropriate improvement action, if there is an abnormal condition, which allows the user to take improvement action against the abnormal condition by himself without calling a service person. It is also possible to prevent a breakdown which is caused by continued long-term improper installation or usage.

Further, since the outputting means outputs the improvement action to be taken based on a re-diagnosis which is performed by the diagnosis means after the predetermined time, it is possible to diagnose with an enhanced reliability.

Still further, memory means is provided which stores the condition-indicative quantities which are detected by the detecting means for a predetermined period, and the diagnosis means diagnoses based on the condition-indicative quantities covering the predetermined period which are stored in the memory means. Hence, it is possible to accurately diagnose without influence of a condition-indicative quantity which suddenly appears.

Still further, since the outputting means provide a visual and/or auditory display, it is possible to easily inform a user of a diagnosis result.

What is claimed is:

1. A self-diagnosing apparatus for a refrigerator which self-diagnoses an operation condition of the refrigerator, comprising:

detecting means which detect a plurality of condition-indicative quantities with respect to said refrigerator;

threshold value memory means which stores two steps of threshold value, a first of which is threshold value with respect to abnormality of operation condition and a second of which is threshold value with respect to abnormality caused by a breakdown of a machine;

action data memory means which stores data of an improvement action to correct a breakdown and data of advice as to a way of using a machine in order to avoid abnormality of operation condition;

diagnosis means which compares said condition-indicative quantities or a diagnosis calculation value which is calculated based on said condition-indicative quantities with said first threshold value and with said second threshold value, judges whether an operation condition of said refrigerator is normal or abnormal and whether the machine itself is normal or abnormal, and selects an improvement action in said action data memory means for a diagnosed abnormal mechanical breakdown and selects advice as to a way of using a machine in said action data memory means for a diagnosed abnormal operation condition; and an outputting means which provides at least one of a visual and an auditory display, outputs the data of the usage method-related advice mode selected by said diagnosis means and retrieved from said data memory part.

2. A self-diagnosing apparatus for a refrigerator of claim 1, further comprising memory means for storing said condition-indicative quantities which are detected by said detecting means for a predetermined period, wherein said diagnosis means diagnoses based on said condition-inclusive quantities covering said predetermined period which are stored in said memory means.

3. A self-diagnosing apparatus for a refrigerator of any one of claim 1, wherein said outputting means may provide a visual and/or auditory display.

4. The self-diagnosing apparatus for a refrigerator of claim 1, wherein a second diagnosis is informed to a user when abnormality is detected at the time of a first diagnosis.

5. The self-diagnosing apparatus for a refrigerator of claim 2, wherein a second diagnosis is informed to a user when abnormality is detected at the time of a first diagnosis.

6. The self-diagnosing apparatus for a refrigerator of claim 3, wherein a second diagnosis is informed to a user when abnormality is detected at the time of a first diagnosis.

* * * * *